Oct. 30, 1945.  F. R. HENSEL  2,387,903
CONTACTING ELEMENT
Filed March 14, 1944

INVENTOR.
Franz R. Hensel
BY Chester F. Carlson
ATTORNEY

Patented Oct. 30, 1945

2,387,903

UNITED STATES PATENT OFFICE 2,387,903

CONTACTING ELEMENT

Franz R. Hensel, Indianapolis, Ind., assignor to P. R. Mallory & Co., Inc., Indianapolis, Ind., a corporation of Delaware Application March 14, 1944, Serial No. 526,349

9 Claims. (Cl. 219—4)

This invention relates to improvements in electrical contact elements, and more particularly to metal backings for refractory or hard metals or compositions such as these materials which are resistant to high temperatures, wear, impact or electric arcs and combinations of these agencies.

In the manufacture of electrical contact assemblies, it is the usual practice to attach the contact material such as tungsten or the like in the form of discs or in other desired contact shapes to metal backings, such as steel rivets or screws, armature blanks, lever arms, copper welding electrodes, etc. The contacts are ordinarily secured to the backings by fusion, such as by brazing, welding, casting and the like. It is customary, for example, to insert a piece of copper or silver solder or similar material between the contact piece and the backing blank and then to bring the parts up to a temperature sufficient to melt the brazing metal and fuse or alloy it with the adjacent contact and backing surfaces so that a strong bond between the contact and the backing blank will be formed. However, the coefficient of thermal expansion of the refractory contact facing material such as tungsten is considerably lower than the coefficient of expansion of the ferrous or non-ferrous metal or alloy of the backing blank; therefore, upon cooling after welding or brazing, or during the operation of the contact element, considerable stresses and strains are generated in contact elements of this type, such stresses being sufficient to cause the cracking, or at least the premature deterioration, of the contact assembly.

This type of deterioration is especially pronounced when very thin sections or discs of the tungsten contact material are used. For example, tungsten contact elements of about .015 inch in thickness will crack or become distorted very quickly. With elements having a thickness of .025 inch or greater, the deterioration may not be readily apparent for various lengths of time, but after a shorter or longer period, cracks will frequently appear which are easily visible under the microscope and are sometimes apparent to the naked eye. Any mechanical operations performed subsequent to the brazing contribute to the deterioration. The cracks are brought out easily, for example, during spinning, staking, etc., but the cracking or warping will often occur while the assemblies are kept in storage before they have been placed in actual use. Even where actual cracking does not occur, the distortion introduced into the contact face may frequently be sufficient to greatly impair the value of the product. If a tungsten disc of .015 inch in thickness and ¾ inch in diameter is brazed to a thin low-carbon steel disc of similar size, for example, the contact surface in the finished assembly will in most cases assume a clearly discernible convex shape. The danger of cracking becomes very pronounced as the cross-section of the tungsten increases. The strength of tungsten is a function of the amount of work applied to the sintered ingot. In tungsten it is necessary to have a fine elongated grain structure to obtain maximum physical properties. Therefore while fine tungsten wire may be produced with a tensile strength of 300,000 p. s. i., forged tungsten slugs will show a strength of only about 40,000 p. s. i.

An object of this invention is to avoid the above disadvantages and to provide composite electrical contact elements having improved operating characteristics and a greatly increased service life.

Another object of this invention is to avoid the setting up of harmful stresses in welded or brazed multi-metallic contact elements.

A further object of the invention is to produce an improved assembly of a hard or refractory metal or composition with a backing therefor which will substantially eliminate surface stresses of the contact face.

Other objects and advantages of this invention will in part be obvious and will in part appear from the following description taken in connection with the accompanying drawing in which Figure 1 shows a view in side elevation of a contact disc constructed in accordance with this invention;

It is proposed according to the present invention to braze or otherwise attach contact facing discs or similar parts made from hard or refractory metals or compositions such as tungsten or the like, to an intermediary backing member made of molybdenum which has a coefficient of expansion substantially the same as tungsten and which is adapted to substantially eliminate or minimize the surface stresses set up in the contact face; the bimetallic body thus obtained may then be attached to the backing member proper such as a steel rivet, a screw, an armature blank, a lever arm, a welding electrode, etc. by brazing or welding.

Figure 1:
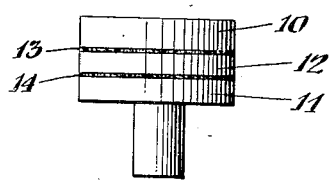

Referring to Figure 1, there is shown a composite contact element comprising a contact facing disc 10 consisting of tungsten and a backing member 11 which may be a rivet made of carbon steel or other suitable ferrous material. The coefficient of expansion for carbon steel may be approximated as $12 \times 10^{-6}$. As shown, the contact disc and steel rivet are not in direct contact with each other, but are united by interposing a disc of molybdenum 12 to which the upper and lower member of the composite body are integrally united by brazing or welding as shown at 13 and 14 respectively. Molybdenum has substantially the same coefficient of expansion as tungsten ($4.44 \times 10^{-6}$ for tungsten and $4.9 \times 10^{-6}$ for molybdenum), and since it is much more ductile when cold than tungsten, substantially no harmful stresses are set up either in the contact facing material or at the interface of these two metals during the heating or cooling thereof or during the operation of the contact assembly. Molybdenum is considerably less expensive than tungsten, and if desired, can be used in very thin sections, whereas tungsten has to be used in heavier sections.

Furthermore, molybdenum being more ductile than tungsten, it is capable of adjusting its rate of contraction to that of the backing material, and thus the stresses set up by the brazing or welding processes are reduced to a minimum, and distortion and cracking are eliminated or minimized.

Figure 2:
Figure 2 shows a view in side elevation of a modified contact element.
Figure 3:
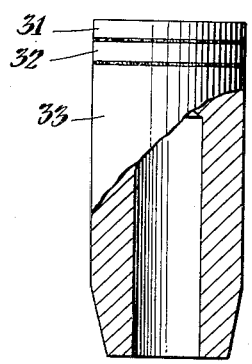
Figure 3 shows a view, partly in section, of a further embodiment of the invention as applied to a pressure-exerting welding electrode.

Figure 2 shows a breaker lever arm of the type used in automotive ignition systems and the like. The assembly comprises a refractory contact disc 21 of tungsten, brazed or fused to the stress-equalizing member 22 of molybdenum, which is in turn welded or brazed to the contact arm 23 consisting of steel, copper, brass, bronze, or any other desired material.

The contact element represented by Figure 2 is a pressure exerting electrode for electric welding. Here the assembly comprises a hard or refractory contact tip 31 of tungsten, which is brazed or welded to the stress-equalizing member 32 of molybdenum, the latter being in turn secured, as by welding or brazing to the electrode body 33 consisting of copper or any other suitable electrically conductive material.

Various modifications of the present invention will occur to those skilled in the art, such as the application thereof to the production of sliding contacts, spark gap electrodes, electrical resistance electrodes, seam welding electrodes, X-ray targets, etc. In X-ray anodes or targets as made heretofore, usually rather large plates of tungsten are attached to a copper backing member. The surface temperatures of the targets are extremely high at times, and therefore considerable thermal stresses are set up causing cracking and flaking of the tungsten, thereby lowering the life of X-ray tubes containing such anodes. The present invention substantially or entirely eliminates the thermal stresses in the tungsten anode by using a molybdenum interlayer between the copper backing member and the tungsten plate, and thus the life of such tubes is considerably increased. In this application, in addition to silver solder or copper-base brazing compounds, brazing media such as nickel-base eutectic compositions may be used, as well as manganese-base materials having a relatively low melting point.

While the invention, as to its objects and advantages, has been described herein as applied to specific embodiments thereof, it is not desired to be limited thereby, but it is intended to cover the invention broadly, within the spirit and scope of the appended claims.

What is claimed is:

1. An electrical contact assembly comprising a hard refractory facing member and a backing member of a material having a coefficient of expansion such that the direct assembly by fusion of said two members would set up detrimental stresses in said hard refractory material, and intermediate said members a stress-equalizing element containing a predominating proportion of molybdenum and having a coefficient of expansion approximating that of the contact facing member and being united by fusion to both of said first-named members.

2. An electrical contact assembly comprising a hard refractory facing element made of tungsten, said element being integrally bonded to a backing element through the interposition of a stress relieving member consisting substantially of molybdenum.

3. An electrical contact element having a contact surface portion of tungsten and a body portion having a thermal coefficient of expansion different from that of said surface portion and, uniting said portions, a portion consisting substantially of molybdenum.

4. An electrical contact element having a contact surface consisting substantially of tungsten, a body portion having a thermal coefficient of expansion different from that of said tungsten, and, integrally united by fusion to each of said elements, an intermediary stress-relieving element consisting of molybdenum.

5. A composite welding electrode comprising a main body portion of a material having satisfactory electrical conductivity, a tip portion consisting of a hard and refractory material containing a predominating proportion of tungsten and integrally uniting said portions by being fused therebetween a third portion consisting of molybdenum.

6. A pressure-exerting electrode for electric welding comprising a main body portion formed of copper, a welding tip or portion of tungsten, and intermediate said portions, a stress-minimizing section formed of molybdenum.

7. In an electrical contact assembly, a support member having a relatively low ductility characteristic; an intermediate member secured to said support member and having a relatively high ductility characteristic; and a contact member secured to said intermediate member and having a relatively low ductility characteristic, said support member and said contact member being further characterized in that their coefficients of expansion are different to a substantial degree, whereby the effects of opposing actions of said support member and said contact member resulting from said difference in their coefficients of expansion are to a large degree absorbed by said intermediate member due to its high ductility characteristic, without harm to said assembly.

8. In an electrical contact assembly, a support member having a relatively high coefficient of expansion and low ductility characteristic; an intermediate member secured to said support member and having a relatively low coefficient of expansion and high ductility characteristic; and a contact member secured to said intermediate member and having a relatively low coefficient of expansion and relatively low ductility characteristic, whereby the effects of opposing actions of said support member and said contact member resulting from the difference in their coefficients of expansion are to a large degree absorbed by said intermediate member due to its high ductility characteristic, without harm to said assembly.

9. An electrical contact element having a contact surface disc of tungsten and a body portion having a thermal coefficient of expansion different from that of said surface disc, and, uniting said portion and said disc, a disc consisting substantially of molybdenum.

FRANZ R. HENSEL.